(12) United States Patent
Pawluczyk et al.

(10) Patent No.: US 6,912,049 B2
(45) Date of Patent: Jun. 28, 2005

(54) ELECTROMAGNETIC RADIATION ATTENUATING AND SCATTERING MEMBER WITH IMPROVED THERMAL STABILITY

(75) Inventors: Romuald Pawluczyk, Ontario (CA); Theodore Cadell, Ontario (CA); Bronislaw Bednarz, Ontario (CA); Ashwani Kaushal, Ontario (CA)

(73) Assignee: NIR Diagnostics, Inc., Ontario (CA)

( * ) Notice: Subject to any disclaimer, the term of this patent is extended or adjusted under 35 U.S.C. 154(b) by 371 days.

(21) Appl. No.: 10/321,510

(22) Filed: Dec. 18, 2002

(65) Prior Publication Data

US 2004/0008343 A1 Jan. 15, 2004

Related U.S. Application Data

(60) Provisional application No. 60/340,849, filed on Dec. 19, 2001.

(51) Int. Cl.[7] .................................................. G01J 1/10
(52) U.S. Cl. ..................................................... 356/243.1
(58) Field of Search .......................... 356/243.1, 243.8, 356/300–302, 304–307, 319, 326, 328

(56) References Cited

U.S. PATENT DOCUMENTS

| | | | |
|---|---|---|---|
| 3,694,654 A | 9/1972 | Crownover | 250/83.3 |
| 3,942,899 A | 3/1976 | Longhenry | 356/234 |
| 4,291,981 A | 9/1981 | Ohnishi et al. | 356/244 |
| 5,324,937 A | 6/1994 | Chen et al. | 250/252.1 |
| 6,320,887 B1 | 11/2001 | Kerr et al. | 372/29.021 |
| 6,621,574 B1 * | 9/2003 | Forney et al. | 356/301 |
| 2004/0169857 A1 * | 9/2004 | Acosta et al. | 356/328 |

* cited by examiner

Primary Examiner—Michael P. Stafira
(74) Attorney, Agent, or Firm—Morgan, Lewis & Bockius

(57) ABSTRACT

The present invention provides a thermally stable reference member comprising, at least one radiation attenuating element and at least one radiation scattering element. The radiation attenuating element comprising at least one aperture for transmission of radiation therethrough. The attenuating and scattering elements placed in series so that radiation transmitted through the reference member passes through each of the attenuating and scattering elements. The attenuating and scattering elements of the reference member may further comprise a thermally stable mount to hold the elements in a selected position relative to each other, and in relation to an instrument, or the elements may be bonded together. The radiation attenuating element may be comprised of a material selected from the group consisting of INVAR, tungsten, brass, and a material substantially non-transparent for incident radiation, and the radiation scattering element may be comprised of a radiation scattering material selected from the group consisting of opalescent glass, SPECTRALON, PTFE, ZERODUR, fused silica, quartz, sapphire, diamond, and a transparent material with essentially low thermal expansion.

26 Claims, 6 Drawing Sheets

ELECTROMAGNETIC RADIATION ATTENUATING AND SCATTERING MEMBER WITH IMPROVED THERMAL STABILITY

This application claims benefit under 35 U.S.C. § 119(e) of U.S. provisional application No. 60/340,849, filed Dec. 19, 2001, herein incorporated by reference in its entirety.

This invention relates to the field of devices for attenuation and scattering of electromagnetic radiation, which may be applied in spectroscopic devices and methods for measuring absorption and attenuation of electromagnetic radiation scattering samples. More specifically, the present invention provides electromagnetic radiation attenuating and scattering members with improved thermal stability for use as, but not limited to, calibrator or reference members for spectroscopy.

BACKGROUND OF INVENTION

In many fields, biology and medicine in particular, there is a rapidly increasing need for a spectral analysis of electromagnetic radiation scattering samples being a part of a larger organism, a human body for example. Standard spectrometric methods are based on Beer's law. The law states that, if there is a spectral band where only one substance contributes to the absorbance of the electromagnetic radiation, the negative logarithm of ratio of the radiation flux transmitted through the sample to that of incident is proportional to concentration of the absorbing substance. When ten (10) is used as a base of the logarithm, usually this is referred to as optical density and is expressed in O.D. units. To be able to calculate the substance concentration from the above dependence, it is necessary to know the electromagnetic radiation attenuation due to absorbance, the sample thickness and specific absorbance of the substance per unit of the sample thickness and concentration. As known to those of skill in the art, if there is no mechanism to distinguish losses caused by different substances or different physical processes from that caused by measured substance, these losses will be added to changes in measured transmittance and will lead to measurement error. Therefore, to eliminate such a source of error, it is important to ensure that radiation travels a well known, or predetermined path, and to identify radiation losses caused by absorbance of the measured substance only. Therefore all other losses, for example, those caused by scattering, should be eliminated. Furthermore, care needs to be taken to ensure that all radiation follows a predefined optical path to be captured by electromagnetic radiation analyzing and measuring systems.

The specific absorbance is typically obtained from a table, or it may be determined through a calibration process, consisting of the preparation and measurement of one or more samples having a known thickness and containing known concentrations of the analyzed substance. If the sample, or reference member, used for the calibration process is made of a solid material it may be produced in a form of a slab of precisely measured thickness with two plane parallel well-polished surfaces. Gas or liquid calibration samples are typically kept in a cuvette with plane parallel, precisely distanced walls.

The precise measurement of the concentration of a chemical component in a sample, applying Beer's law, is possible only when the attenuation due to the component and the thickness of the sample are known with sufficient precision and when the measuring instrument is able to perform measurements of attenuation appropriately. While it is possible to produce samples of precisely determined thickness, it is much harder to produce a beam of electromagnetic radiation whose path through the sample is precisely equal to the sample thickness. This can be achieved only when a very well collimated electromagnetic radiation beam traverses the sample perpendicularly to the surface of its walls without any disturbance, such as that caused by scattering. A well-collimated beam of radiation can be produced either from a laser beam, typically a narrow band laser beam, or from a very small source of broad band electromagnetic radiation. In the last case, incandescent or high-pressure arc sources are most often used. The spectral intensity of the radiation created by non-laser sources is limited by their temperature, which is usually limited by various technical factors. Therefore, there is a limit on the amount of broad band radiation that can be converted into a collimated beam of a given diameter. The limited flux of available radiation limits the degree to which attenuation can be measured with an acceptable precision. In some cases, attenuation of radiation in the sample may be so large that a collimated beam cannot provide enough power for precise measurements of the sample without the use of very sophisticated data collection methods.

Therefore, standard spectrometers are designed to produce a well defined, most often well collimated, beam of electromagnetic radiation, whose spectral content (spectral power distribution) can be precisely analyzed by means of a spectrum analyzer and measured with a electromagnetic radiation intensity measuring device. The result, i.e. presenting the spectral power density as a function of wavelength (or, in equivalent terms, of wave number or vibration frequency) of radiation, can be stored for reference. After the reference measurement is completed, a sample is introduced into a radiation path, the beam passes through (interacts with) the sample and the spectral content of this beam is measured and stored. In some systems, instead of moving the sample into and out of the beam, the beam itself is forced to take two different paths: in one path, the beam bypasses the sample, and in a second path, the beam passes through the sample, before reaching the spectrum analyzer. The analyzer registers the spectral power distribution of both paths. In other systems, two separate beams are created. One beam goes through a sample, while the second beam bypasses it. The spectral content of each of these beams is measured, in most cases preprocessed, and stored for further analysis. Attenuation of electromagnetic radiation in the sample (or its spectral absorbance, or spectral optical density, which are equivalent) as a function of wavelength can then be calculated from these two measurements made by either of these instruments. The spectral dependence of attenuation of the radiation in the sample is determined by optical properties of the sample and usually can be related to its chemical composition. Reconstruction of the chemical composition of the sample from the spectral dependence of attenuation of radiation is a subject of spectroscopy.

As explained earlier, the dependence of the attenuation on the length of the radiation path in the sample and the chemical composition of the sample is expressed by Beer's law, which provides a mathematical relation between these two parameters. Applying this law, it is possible to calculate the concentration of a chemical component in a sample of a given thickness, if there exists a wavelength, at which only this component absorbs the radiation, and for which specific attenuation (or specific absorbance) of radiation is known. If the sample contains a large number of components with overlapping absorption spectra, a measurement at a single wavelength might not be sufficient to calculate the concentration of any individual component. In such a case, measurement at a larger number of wavelengths, as well as more advanced data analysis is typically required. Methods to perform such analysis are collectively known as chemometric methods.

Chemometric methods can be used in different ways, depending on the amount of information available on a sample and an instrument. In classic spectrometry, when the length of the radiation path in the sample, and the optical properties of all chemical components in the sample are known, the concentration of the chemical components can be found by measuring the absorption by the sample at specific wavelengths, and by resolving a suitable set of linear equations. If, however, some chemical components present in the sample are unknown, the concentration of the components of interest can still be determined using a suitable chemometric calibration of the measurement process. Such calibration involves determining an instrument response to samples that comprise various known concentrations of the components of interest and different concentrations of all other components. The concentration of these potentially interfering other components may not be known, but care must be taken to assure that these calibration measurements cover the full range of variability for each unknown (interfering) component. If a sufficiently large set of measurements, covering expected ranges of concentration variability of all (known and unknown) components is available, it is possible to build a mathematical model describing the response of the instrument to these various concentrations of known chemical compounds within the sample. By applying this model to further measurements of an unknown sample, it is possible to calculate the concentration of the component(s) of interest in the sample, under the condition that all parameters influencing the measurement are within variability range used for model development (calibration). It is preferred that with an increase in the number of components in the sample, a larger number of measurements be obtained at different wavelengths. Similarly, as the range of concentration variability of each component increases, it is required that a larger number of measurements be obtained for instrument calibration. Applying the same principle it is possible to measure the concentration of selected analytes in samples of complex shape and unknown chemical content. In particular, this approach can be used for spectroscopic measurements of electromagnetic radiation scattering samples, such as in-vivo measurement of glucose concentration in the human body.

In measuring components in non-scattering samples, where all non-absorbed electromagnetic radiation can be collected efficiently by the optical system of the spectrometer, losses caused by absorption can be easily identified and used in the analysis. The situation is different for electromagnetic radiation scattering samples. In the latter case, due to scattering, a portion of the radiation changes its direction of propagation, and might leave the optical system without being detected. Some of this scattered radiation, however, as a result of multiple scattering and a longer optical path, can still reach the spectrum analyzer and contribute to the collected signal, which is analyzed. Because of the longer optical path of the scattered radiation, the registered signal has different characteristics than that provided by non-scattered radiation. Although the scattered radiation does not carry information pertaining to the chemical composition of the sample, it does provide information on the scattering properties of the sample, which needs to be taken into account in further analysis. As a result, a measured signal depends not only on the absorption properties of the sample, but also on its radiation scattering properties, and the radiation collecting capability of the optical system used. Therefore, Beer's law cannot be directly applied to electromagnetic radiation scattering samples and more sophisticated chemometric methods that are able to take into account the impact of scattered electromagnetic radiation and variability of the instrument on the measurement are required in order to obtain information on the chemical composition of the sample. As in the case of samples with unknown composition, distortion of an absorption signal by the scattering sample can be taken into account by calibration of the system's response to a range of samples of different composition and of different scattering properties.

In the case of electromagnetic radiation scattering samples, there is typically no way to collect all unabsorbed radiation, and each system has to be individually calibrated. Therefore, because of the inability of preserving a predefined optical path in the sample, and capturing all non-absorbed radiation, there is no need to apply a well-defined beam of radiation for sample illumination. A non-collimated beam, or even scattered radiation can be used to measure the absorbance of an electromagnetic radiation scattering sample. This opens a way for more efficient use of radiation, including that produced by a large source of radiation. To take a full advantage of the situation, the measurement systems used for characterization of radiation scattering samples are designed to fully exploit the optical properties of electromagnetic radiation scattering samples and available electromagnetic radiation sources. This is achieved by applying a non-collimated (i.e. divergent, convergent, or scattered) beam of radiation for sample illumination. A significantly higher portion of radiation generated by a source is used for sample illumination, as, a result, allowing for measurement of samples causing significantly higher radiation losses with a better signal to noise (S/N) ratio when compared with normal spectrometry. Higher power density, however, may start to impact the optical properties of the reference member and sample, and indeed changes in their optical properties caused by radiation used for measurement have been observed in various reference members developed for collimated and non-collimated beams.

One result of using a non-collimated beam for sample illumination is that reference standards, designed to work with collimated beams, cannot be used for calibration of spectrometers designed to work with scattered radiation, and that special reference standards are required, especially for precise measurements. To imitate the radiation scattering samples, such standards should scatter radiation, work within a non-collimated beam, and produce significant radiation reduction, similar to that caused by the radiation scattering samples. For some applications they should also demonstrate great temporal and environmental, for example, temperature stability. While there exists some radiation scattering and absorbing materials, which are used in present day devices, their environmental instability, including changes in their optical properties under influence of high power optical radiation, makes them useless for demanding applications, for example, in non-invasive, in-vivo glucose concentration measurement.

The need for calibrators that absorb and scatter electromagnetic radiation has been recognized and several technical solutions proposed. U.S. Pat. No. 4,291,981 describes a reference scatterer made of micro-crystals that are enclosed in a transparent vessel, the gap between the micro-crystals and the vessel being filled with a liquid. U.S. Pat. No. 3,942,899 discloses a scattering neutral density filter for calibrating a photometering instrument. Unfortunately, because of the materials used, neither one of these reference members exhibits a required environmental stability. It is well known for these skilled in the art that both refractive index and absorbance of liquids are strongly temperature dependent. As a result, both the scattering properties of the scatterer containing micro-crystals embedded in the liquid, and the absorbing properties of such scatterer will be strongly temperature dependent. The calibrator described in the U.S. Pat. No. 3,942,899 is composed of neutral density filter combined with a electromagnetic radiation scattering diffuser made of a glass plate with a frosted or a grounded surface. While thermal stability of such a combination is usually higher than that of the scatterer containing the liquid, it still exhibits a measurable thermal effect. The effect is strong enough to produce a measurable absorbance change under the influence of high power radiation used for measurement of electromagnetic radiation scattering samples. Furthermore, a single electromagnetic radiation scattering surface is usually not sufficient to efficiently control the angular distribution of scattered radiation. There is therefore a need to provide better calibrators, also referred to herein as reference standards, or reference members, for measurements involving scattering samples.

The present invention provides an electromagnetic radiation, attenuating and scattering member with improved thermal stability that can be used as a calibrator or reference member in spectroscopy involving radiation scattering samples. Furthermore, the present invention provides an electromagnetic radiation attenuating and scattering member with improved thermal stability that permits selective control of scattering properties and attenuation of radiation.

It is an object of the invention to overcome disadvantages of the prior art.

The above object is met by the combination of features of the main claims, while the sub-claims disclose further advantageous embodiments of the invention.

SUMMARY OF THE INVENTION

This invention relates to the field of devices for attenuation and scattering of electromagnetic radiation, light in particular, which may be applied in spectroscopic devices, and methods for measuring absorption and attenuation of electromagnetic radiation by attenuating and scattering samples and samples combining attenuating and scattering properties. More specifically, the present invention provides an electromagnetic radiation attenuating and scattering member for use as, but not limited to, a calibrator or a reference member with improved thermal stability for spectroscopy, radiometry and spectroradiometry.

The invention provides an electromagnetic radiation attenuating and scattering member, also referred to as a reference member, with improved thermal stability that provides independent control of scattering properties and attenuation of radiation. This member may be used as a reference for characterization and standardization of spectroscopic instruments designed for spectral measurement of radiation scattering and attenuating samples in transmittance. The properties of the reference member are achieved by application of special optical components, made of special materials and the combination of these components within the member. While there exist a preferred set of materials providing the best performance, for some applications, materials with less demanding characteristics can be used.

Thus, in one aspect of the invention, there is provided a reference member for controlled attenuation and scattering of an electromagnetic radiation beam. The reference member comprising at least one radiation attenuating element with improved thermal stability having at least one opening for passage of the electromagnetic radiation beam, and at least one radiation scattering element with improved thermal stability. The reference member may further comprise a mount to hold the radiation attenuating element and the scattering element in a selected position relative to each other within the mount and relative to the beam, when the reference member is placed between a source generating the radiation beam and a detector. Alternatively, the elements of the reference member may be placed in series and bonded together.

The present invention also provides the reference member, as defined above, wherein the radiation attenuating element comprises a material that blocks, attenuates, absorbs, reflects, back scatters or a combination thereof, any incident radiation with one or more openings, made by any known mean like cutting, drilling, applying photolithographic methods, high energy radiation beams or by any other means known by those skilled in the art, partially or totally transparent for the incident radiation. Preferably, material is selected from the group consisting of INVAR, tungsten, brass, and a material substantially non-transparent for incident radiation.

Further, the present invention pertains to the reference member as defined above wherein the radiation scattering element is comprised of a volume radiation scattering material selected from the group consisting of opalescent glass, SPECTRALON, PTFE, and a partially or totally non-absorbing material whose surface may be modified to scatter radiation selected from the group consisting of ZERODUR, fused silica, quartz, sapphire, diamond, and a transparent material with substantially low thermal expansion. The radiation scattering element may further comprise an electromagnetic radiation scattering structure on one or both surfaces. If the material itself does not scatter electromagnetic radiation, the surfaces of the scattering element can be mechanically ground, chemically etched or photolitographically etched.

The present invention also embraces a radiation attenuating and scattering reference member with improved thermal stability comprising:

a radiation attenuating-scattering element comprising a first, and a second surface, wherein a portion of the radiation attenuating-scattering element is opaque to electromagnetic radiation and comprises one, or more than one aperture in the first surface for transmission of radiation therethrough, and wherein the second surface is modified to scatter electromagnetic radiation.

The present invention also relates to the radiation attenuating and scattering reference member as just defined, wherein the radiation attenuating-scattering element comprises a material selected from the group consisting of opalescent glass, light scattering ceramic, TEFLON, PTFE, and SPECTRALON. Alternatively, the radiation attenuating-scattering element comprises a partially or totally radiation non-absorbing, non-scattering, thermally stable material, whose surface can be modified to scatter incident radiation in a random or controlled fashion, selected from the group consisting of ZERODUR, fused silica, quartz, sapphire, diamond, low expansion glass, and a non-absorbing material with low thermal expansion, wherein the first surface of the radiation attenuating-scattering element is covered with an electromagnetic radiation opaque layer. The second surface of the radiation attenuating and scattering reference member can be ground or etched or processed in any other means known by those skilled in the art to produce the radiation scattering effect.

There is also provided a method for attenuating electromagnetic radiation comprising;

providing a source of electromagnetic radiation and creating a beam of the electromagnetic radiation;

placing a reference member as described above between the source of electromagnetic radiation and a detector to produce an attenuated electromagnetic beam; and detecting the attenuated electromagnetic beam at the detector.

This summary of the invention does not necessarily describe all necessary features of the invention but that the invention may also reside in a sub-combination of the described features.

Other features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Features of the invention will become more apparent from the following description in which reference is made to the appended drawings wherein:

FIG. 4 is an illustration of a radiation attenuating element with at least one hole for electromagnetic radiation transmission used to attenuate radiation by a given factor.

DETAILED DESCRIPTION OF THE INVENTION

Figure 1:
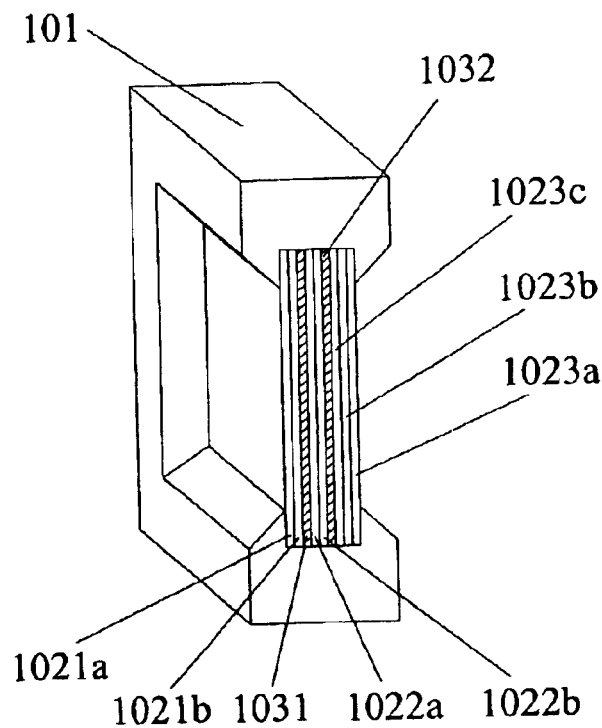
FIG. 1 is an illustration of an example of a reference member consisting of various radiation affecting components.
Figure 2:
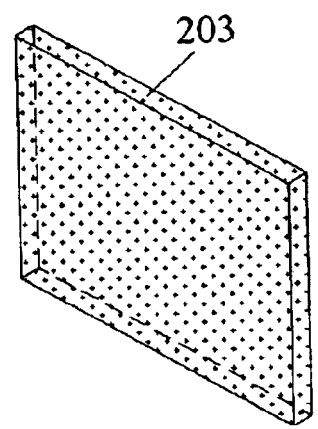
FIG. 2 is an illustration of a radiation scattering element of a reference member made of electromagnetic radiation scattering material, for example but not limited to opalescent glass, Teflon, PFTE, or SPECTRALON.

This invention relates to the field of devices for attenuation and scattering of electromagnetic radiation, which may be used in the calibration of spectroscopic devices, and methods for measuring absorption and attenuation of electromagnetic radiation scattering samples. More specifically, the present invention provides calibrator materials for use as, but not limited to, stable calibrators or reference members for spectroscopy.

The following description is of a preferred embodiment by way of example only and without limitation to the combination of features necessary for carrying the invention into effect.

By "attenuation" or "attenuating" it is meant a reduction in the intensity of a given electromagnetic radiation beam. Attenuation can be achieved by using a device comprising material capable of blocking, absorbing, reflecting, scattering, diffusing, or a combination thereof, the radiation beam. Attenuation may be dependent on the wavelength of radiation, for example, if the attenuation is due to absorption or inelastic scattering (see below).

By "scattering" it is meant the re-emission of radiation in a random direction by an atom or a molecule following excitation of the atom or the molecule by incident radiation. Scattering can be elastic, wherein the wavelength of the scattered radiation is the same as the wavelength of the exciting radiation, or inelastic, wherein the wavelength of the scattered radiation is different from that of the incident radiation.

In an aspect of the present invention, there is provided a radiation attenuating and scattering member (also referred to as a reference member) comprising one, or more than one radiation attenuating element made of material capable of blocking, absorbing, reflecting, back scattering or a combination thereof, and having one, or more than one opening to transmit a portion of incident radiation there through; and one, or more than one radiation scattering element, which when placed together in series within a beam path result in the attenuation and angular redistribution of the beam of electromagnetic radiation to a degree that is substantially similar to that of a given type of sample whose absorbance is to be measured. One advantage of using this reference member is the ability of independently adjusting its absorbing and scattering properties by combining suitable radiation attenuating and radiation scattering elements, to match the attenuation and scattering characteristics of the sample to be measured. The member of the present invention may therefore be used as a reference for calibrating a spectrometer used for spectroscopic measurements of radiation scattering samples, such as light scattering samples.

Preferably, attenuation of radiation within the reference member is controlled by the elements constituting the member. However, it is to be understood that attenuation of a beam may also occur in the interface between the elements within the reference member. A mount (described below) may be used to ensure that the desired relationship between the elements of the reference member is maintained so that the relative position of the elements and their impact on transmitted radiation remains unchanged to a much larger degree than is achievable with present art members. Furthermore, the elements of the radiation attenuating and scattering member may be joined in the presence or absence of a mount using a variety of methods, for example, but not limited to bonding, gluing, fusing, clamping, and the like of the elements together in a way allowing the transmission of electromagnetic radiation from one element to another. It is to be understood that any method for bonding the elements of the reference member of the present invention together may be used. In this manner a reference member comprising a laminate of elements may be produced.

The present invention also pertains to a radiation attenuating and scattering reference member with improved thermal stability comprising a radiation attenuating-scattering element. This radiation attenuating-scattering element comprises the properties of both the radiation attenuating element, and the radiation scattering element described above, but these separate elements are combined within one element. The radiation attenuating-scattering element may beformed of or be coated with a material that is totally or partially non-transparent for incident radiation, and have one or more apertures to permit transmission of electromagnetic radiation therethrough. The radiation attenuating-scattering element further comprises a first and a second surface, where either the first or the second surface faces towards the source of incident electromagnetic radiation. If the radiation attenuating-scattering element is formed of a non-absorbing material, then the first surface may be coated with a totally or partially radiation-opaque coating with one or more apertures to permit transmission of electromagnetic radiation therethrough. The second surface of the radiation attenuating-scattering element may be modified to scatter electromagnetic radiation.

The above described attenuating and scattering elements can be combined in any number, and in any order, to create a radiation attenuating and scattering reference member with improved thermal stability.

With reference to FIG. 1 there is shown an example, which is not to be considered limiting in any manner, of a reference member of the present invention. The reference member of FIG. 1 comprises radiation attenuating elements (1031, 1032) with improved thermal stability, each containing at least one aperture for radiation transmittance, and each made of radiation absorbing, reflecting, or back-scattering material, or material having any combination of these properties, which allow radiation to be directed substantially non-scattered in the forward direction. The reference member also comprises radiation scattering elements (1021(a,b), 1022(a,b), 1023(a,b,c)) with improved thermal stability, which are substantially non-absorbing. The scattering and attenuating elements may be of any suitable shape or size and placed in a way that allows radiation to pass from one element to another. Preferably, these elements are in the form of plates and may be inserted in a thermally stable mount 101 so that electromagnetic radiation transmission from one element to another is possible. However, it is to be understood that the radiation attenuating and scattering elements may be assembled using any method of attachment including adhesion, surface fusion, glue and the like, and may not require a thermally stable mount for use within a spectrophotometer.

By "improved thermal stability" it is meant that the optical properties of the radiation attenuating and the scattering elements change substantially less than any prior art element of similar function, for example, as a result of changes in temperature brought about by the radiation beam. In the case of the mount, improved thermal stability means that impact of the changes in thermal conditions on the optical properties of the reference member is substantially smaller than that observed if the reference member was housed in a mount made from prior art materials of similar function. In particular, environmental stability of the mount ensures that the position of the radiation attenuating and scattering elements relative to the path of the radiation beam and relative to each other remains substantially the same even when the ambient temperature, or the temperature of the reference member is varied. Thermal stability of the radiation attenuating and scattering member as a whole enables precise measurements of transmitted radiation to be made even if high power radiation beams are used, as would be the case for measurements involving highly absorbing and scattering samples.

The radiation attenuating elements may be formed of any thermally stable material that will block, absorb, reflect, back scatter radiation or combine these properties in any ratio. Examples of such material include, but are not limited to foil, sheet material, or thin layer of material produced by any technical means, made of, for example, but not limited to INVAR™, tungsten, brass or any other material with preferably low expansion coefficient. The element may be also comprise a thin layer of any radiation non-transparent material, such as, but not limited to aluminum, chromium, nickel, gold, silver deposited on transparent substrate made of material having a substantially low coefficient of thermal expansion.

In an embodiment of the invention, the amount of attenuation provided by the radiation attenuating element 403 can be controlled by providing at least one aperture 404b (FIG. 4B) within the radiation attenuating element, the size, and position being varied according to the desired amount of radiation to be transmitted, which in turn will be a function of the intensity distribution of the incoming radiation beam.

Figure 4A:
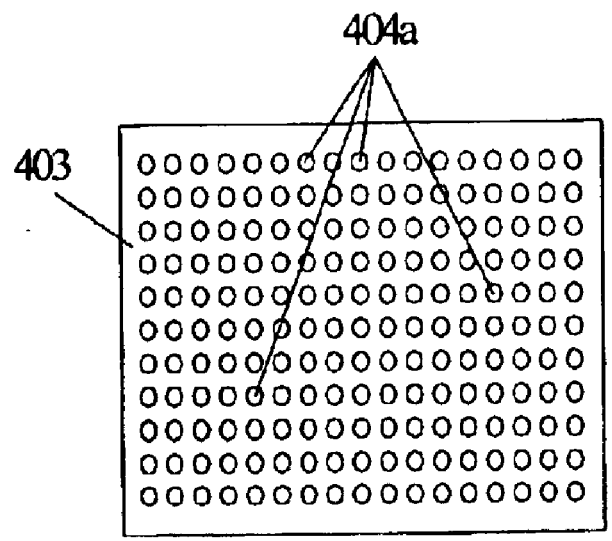
FIG. 4A shows a radiation attenuating element comprising a plurality of apertures.
Figure 4B:
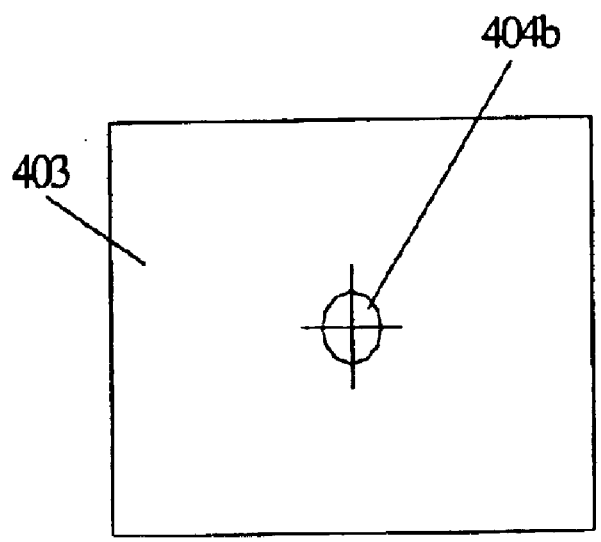
FIG. 4B shows a radiation attenuating element comprising a single aperture.

In another embodiment, the radiation attenuating element 403 can have a plurality of apertures, 404a, as shown in FIG. 4A. The number, size and relative position of the apertures within the radiation attenuating element are selected to achieve the desired amount of attenuation of the incident radiation.

Similarly, the scattering element 203 may be formed of any thermally stable material capable of scattering radiation, or can be made capable of scattering, such as, but not limited to ZERODUR™, fused silica, quartz, sapphire, diamond or a low expansion glass. For less demanding applications, other materials, such as opalescent glass, SPECTRALON™, PTFE or other electromagnetic radiation scattering plastics may also be used.

In an embodiment of the above-described scattering element, one or both surfaces of the scattering element are covered with a radiation scattering or diffracting layer or otherwise treated to produce a desired scattering effect using any suitable method as would be known to one of skilled in the art. The thickness and number of the scattering elements, in the direction of the transmitted radiation, can also be modified to mimic the scattering properties of the sample.

If the material of the scattering element itself does not scatter electromagnetic radiation, a scattering structure can be generated on one, or both of the surfaces of the scattering element by mechanical grinding, chemical etching, by photolitographically producing a regular interference pattern (as produced, for example, by an interference effect of two or more of coherent light beams), by registering of a speckle image (as produced, for example, by interference of coherent light scattered by any light scattering surface), or photolithographically registering any pattern on a photolithographic mask. The structure can be also created by any other photolithographic method including exposure with electron or ion beams. The required structure may also be generated using point by point modification of the surface of the scattering element with a laser of suitable power, or electron or ion beams. The thickness and number of the scattering elements, in the direction of the transmitted radiation, can also be modified to mimic the scattering properties of the sample. It should be understood, however, that the above description of the specific ways to produce required structure, while indicating preferred embodiments of the invention, are given by way of illustration only and are not to be considered limiting.

Figure 3:
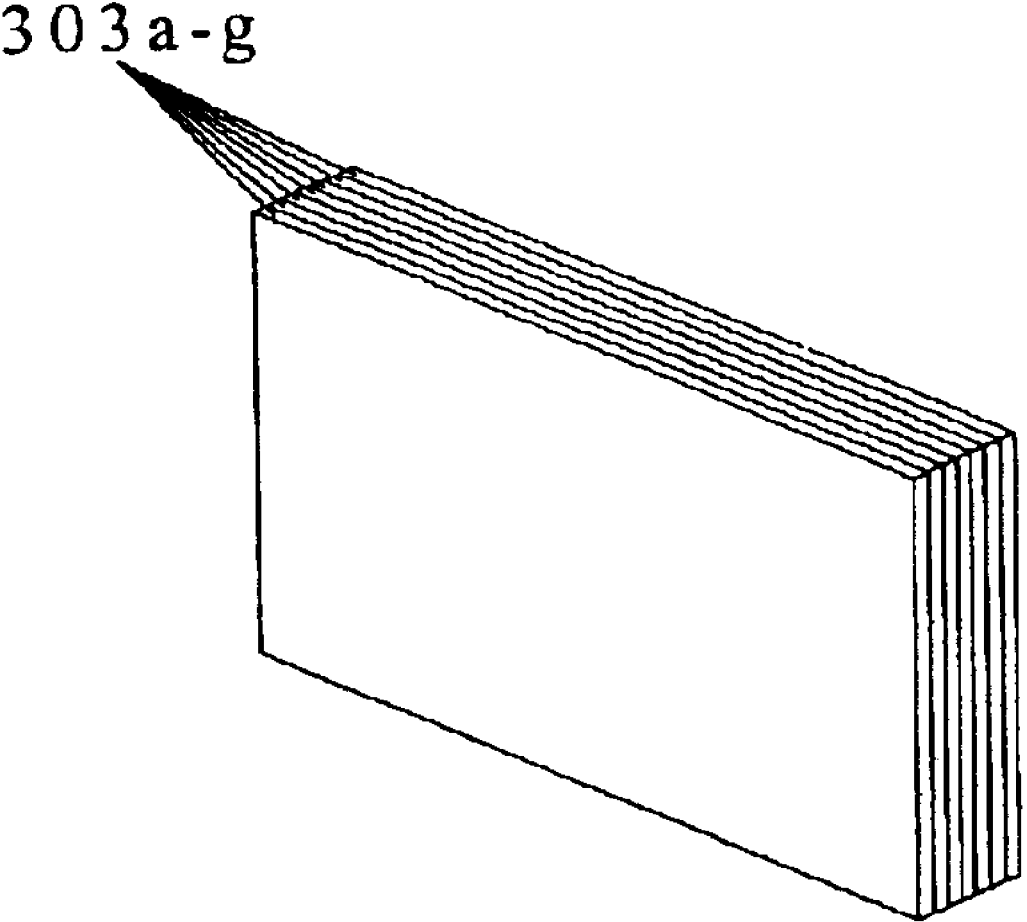
FIG. 3 is an illustration of a radiation scattering element of a reference member comprising a stack of surface electromagnetic radiation scattering plates, made of a material transparent to electromagnetic radiation, for example but not limited to ZERODUR, fused silica, sapphire, diamond, glass or an electromagnetic radiation scattering material, for example but not limited to opalescent glass, teflon, PTFE or SPECTRALON.

It is preferred that the mount (101) maintains the relative position of the radiation attenuating element and the scattering element in a substantially parallel arrangement within the mount, and that the mount maintains the position of the attenuating and scattering elements in relation to the radiation beam. The distance between the elements may also be varied in order to optimize the attenuating characteristics of the device in a desired manner. It is also preferred that the assembled attenuator is positioned substantially perpendicular to a radiation beam when in use. For example, when used in a spectrometer, the attenuating device of the invention may be positioned between the electromagnetic radiation source and the detector. However, it will be appreciated that the position of the attenuator relative to the beam, the electromagnetic radiation source and the detector can be adjusted to substantially mimic the optical properties of the sample. The overall attenuating characteristics of the reference member may also be adjusted by modifying, for example, but not limited to, the number of elements, the number of plates of the radiation attenuating element, the number of the scattering element 303a–g (FIG. 3), the thickness or the elements, or other parameters as desired.

The mount (101, 501, 601) may be formed of any thermally stable material such as but not limited to INVAR™, low expansion ceramic, graphite, tungsten or other material of similar properties. The mount may be equipped with reference points for its precise positioning in the path of the radiation beam.

The attenuating device of the present invention can be used as a calibrator to calibrate and test the stability of spectrometers used in the analysis of electromagnetic radiation scattering samples. By "calibration" it is meant that the response of different instruments to several different calibrators is measured and compared. If necessary, a correcting factor is calculated to find the correspondence in results obtained with different instruments.

Figure 5:
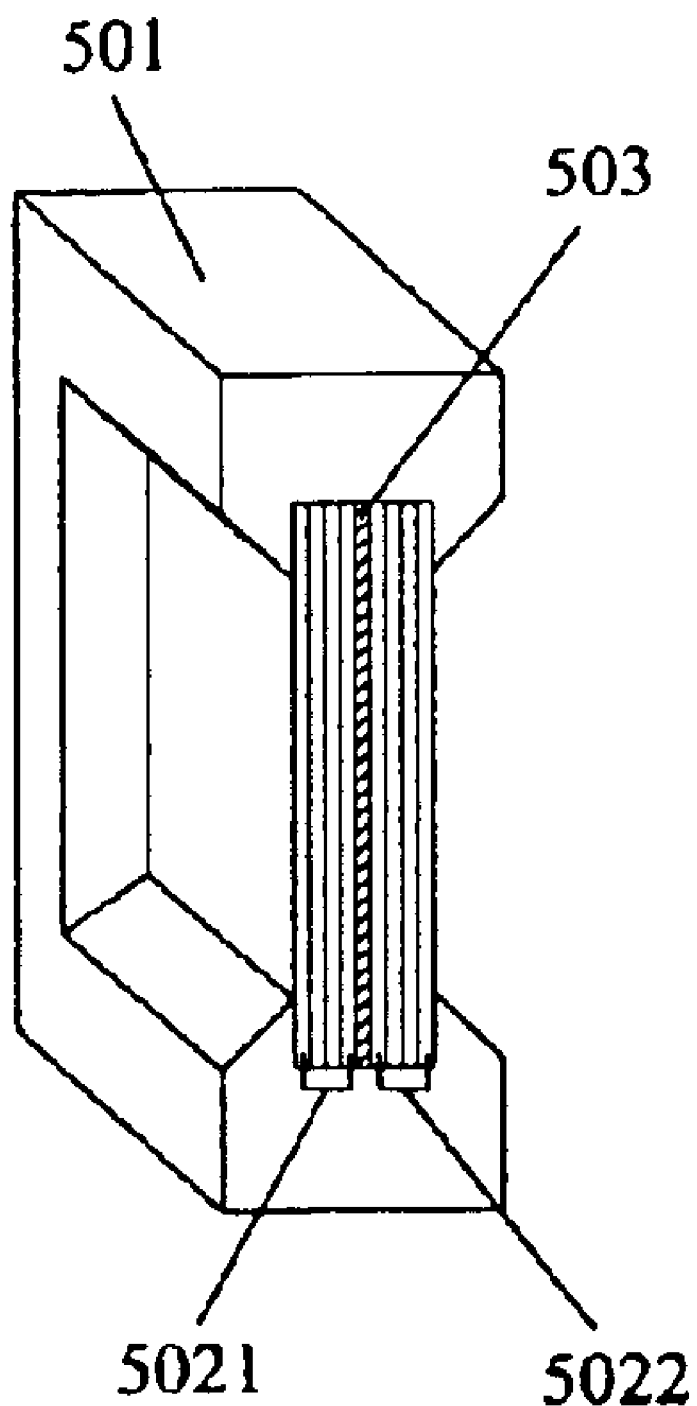
FIG. 5 is an illustration of a reference member within a mount.

With reference to FIG. 5, there is shown a radiation attenuating and scattering member consisting of a mount 501 made preferably of any thermally and mechanically stable material, for example, but not limited to INVAR™, low expansion ceramic, graphite, tungsten or other material with similar properties for secure installation of the optical components (radiation attenuating element and radiation scattering element) within the mount by any means suitable for such task, as for example but not limited to clamping, cementing, gluing and similar and further equipped with mechanical features specific for a selected spectrometer or other device, for ensuring a reproducible and precise positioning of the reference member within the selected spectrometer or device. As shown in FIG. 5, the reference member may comprise:

i) one, or more than one radiation attenuating element 503 with at least one aperture or a plurality of apertures, made of a suitable thermally and mechanically stable foil, for example but not limited to foil made of INVAR™, tungsten, brass, aluminum or other material with similar properties or a thin layer with at least one, or a plurality of apertures of any suitable material deposited on one or both sides of a thermally and mechanically stable substrate made for example but not limited to the ZERODUR, fused silica, quartz, sapphire, diamond, and glass with low thermal expansion coefficient;

ii) one, or more than one stacked scattering elements 5021 and 5022, placed on one or both sides of the radiation attenuating elements and each consisting of electromagnetic radiation partially or totally non-absorbing material, whose surface can be modified to scatter incident electromagnetic radiation selected by preferably but not limited to ZERODUR™, fused silica, quartz, sapphire, diamond, low expansion glass or any other non-absorbing material with low thermal expansion;

iii) alternatively, both functions of attenuating and scattering radiation can be performed by a single element made in a form of plate either from radiation scattering material, for example, but not limited to opalescent glass, light scattering ceramic, TEFLON, PTFE, SPECTRALON, or from any substantially radiation non-absorbing thermally stable material, for example but not limited to ZERODUR, fused silica, quartz, sapphire, diamond, low expansion glass or any other non-absorbing material with low thermal expansion covered on a first side with any essentially light non-transparent layer made, for example, but not limited to chromium, alloy of nickel and chromium, aluminum, silver, gold or any other similar material, having at least one aperture for light transmittance and preferably treated on a second side in a sutiable manner to produce a light scattering structure, for example, but not limited to, grinding or etching;

iv) or a combination thereof.

In this example, the radiation attenuating element is sandwiched within two or more scattering elements.

Figure 6:
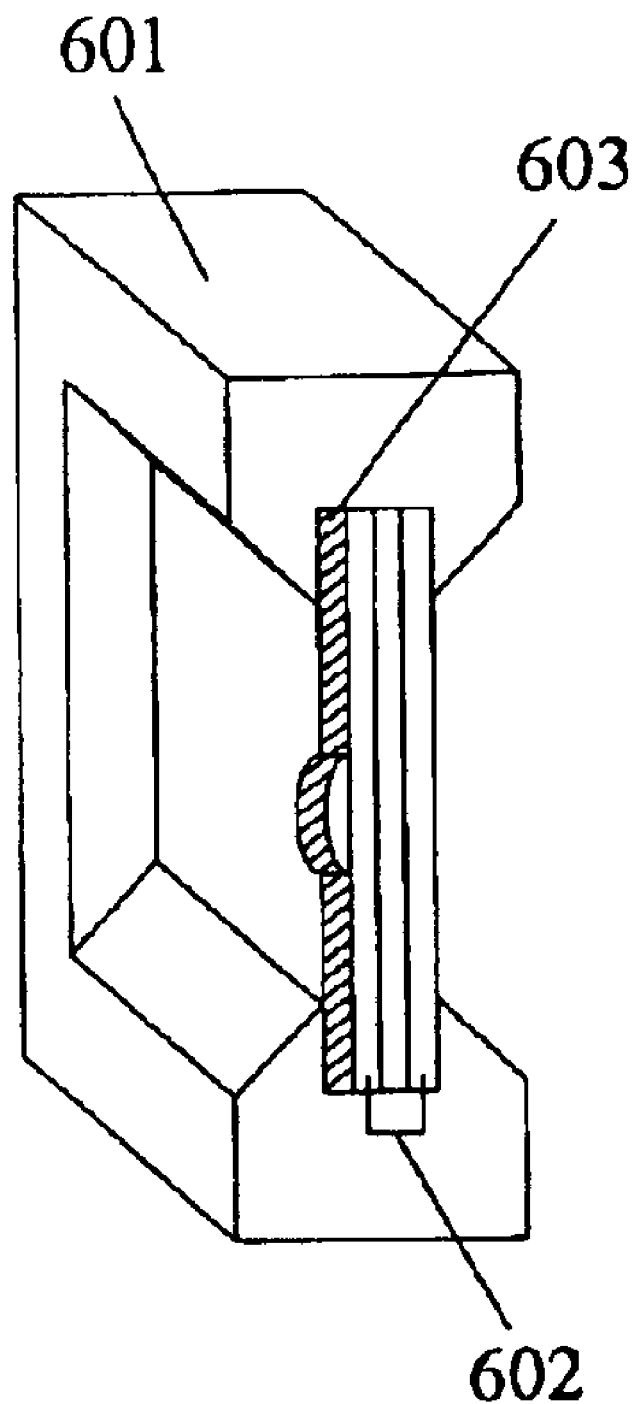
FIG. 6 is another illustration of a reference member within a mount.

In another embodiment (FIG. 6), the reference member comprises a mount 601 made a material with low thermal expansion, for example, but not limited to INVAR™, low expansion ceramic, graphite, tungsten or other material with similar properties. The mount is designed to have a shape, and it is equipped with features for securing the elements of the reference member together and for ensuring reproducible positioning when the reference member is placed within a selected spectrometer or other device. In this example, the reference member comprises:

i) one radiation attenuating element 603 comprising at least one aperture made in a heat stable foil, for example but not limited to INVAR foil; and ii) one, or more than one scattering elements 602. Each scattering element consisting of surface grounded, non-absorbing material, preferably but not limited to ZERODUR.

In this example, the scattering elements are placed on one, or the other, side of the radiation attenuating element 603.

The above description is not intended to limit the claimed invention in any manner, furthermore, the discussed combination of features might not be absolutely necessary for the inventive solution.

The present invention will be further illustrated in the following example. However it is to be understood that these examples are for illustrative purposes only, and should not be used to limit the scope of the present invention in any manner.

EXAMPLE

Performance of the reference member according to this invention was tested on implementation presented in FIG. 5. The member consisted of an INVAR™ mount, for secure reproducible positioning of the reference member in the optical path of the spectrometer for transillumination with visible and near infrared electromagnetic radiation. This system applies high intensity diffuse radiation for sample illumination. Different reference members were tested to evaluate the impact of the high intensity illumination on performance of the members. All measurements consisted of illumination of the member with a high intensity diffused beam of constant intensity, continuous collecting of data with an array based grating spectrometer and averaging data at each pixel of the array for about 5.6 sec. About ten seconds latter the measurement was repeated and the logarithm of the ratio of averaged results for each pixel was calculated.

Figure 7:
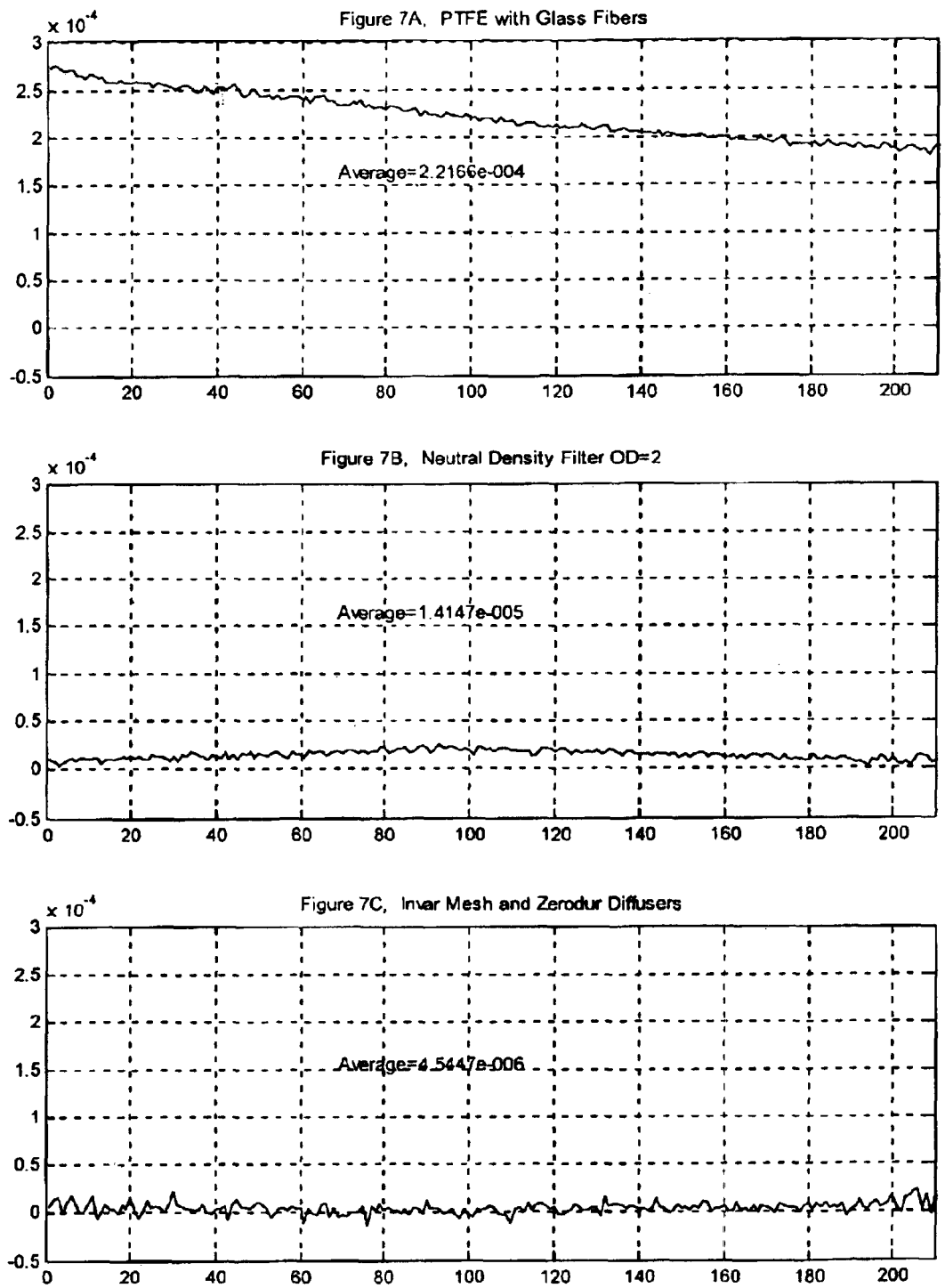
FIG. 7 demonstrates the impact of the radiation used for sample illumination in an electromagnetic radiation measuring system on optical properties of an electromagnetic radiation attenuating element made of PTFE, a material commonly used in infrared spectrometry (FIG. 7A), a prior art neutral density filter (FIG. 7B) used for attenuation of transmitted radiation and the reference members of the present invention (FIG. 7C) under the same measurement conditions.

In an ideal case of a noiseless measurement, a radiation insensitive attenuator should produce zero for all pixels. To reduce possible error caused by the system noise, measurements for each sample were repeated 10 times with 10 minutes between measurements to give the system time to adjust to ambient conditions. Results obtained from these 10 measurements were averaged for each pixel and for each sample, and are shown in FIG. 7. Simultaneously, the average value across all pixels was calculated and is presented as a number near the graphs. For radiation insensitive samples, the calculated number should be equal to zero and departure from this value can be used as a measure of the sensitivity of the device to heating by incident radiation.

FIG. 7A shows results obtained for a diffuser made of PTFE comprising glass fibers. It demonstrates changes in optical properties by about 0.000220, as measured as outlined above.

FIG. 7B presents similar results (but with expanded vertical scale) for a standard 2OD neutral density filter. This Figure shows average changes in optical properties of about 0.000014 units.

In FIG. 7C results for a member produced in accordance with present invention are presented. The tested reference member contained a radiation attenuating element made of INVAR™ foil and four ZERODUR™ radiation scattering elements placed on each side of the radiation attenuating element. The member demonstrates an average change in optical properties on average by about 0.0000045 units, about 3 times better than the neutral density filter and about 50 times better than stability of the diffuser made of glass fiber enforced PTFE diffuser.

These data demonstrate the stability in optical properties of an example of the reference member of the present invention over other, alternative reference members. It is to be understood that other reference members may also be prepared using different materials for radiation attenuating and radiation scattering elements, and also that various combinations of the elements within the reference member may be used.

All publications, patents and patent applications referred to herein are incorporated by reference in their entirety to the same extent as if each individual publication, patent or patent application was specifically and individually indicated to be incorporated by reference in its entirety.

The present invention has been described with regard to preferred embodiments. However, it will be obvious to persons skilled in the art that a number of variations and modifications can be made without departing from the scope of the invention as described herein. In the specification the word "comprising" is used as an open-ended term, substantially equivalent to the phrase "including but not limited to", and the word "comprises" has a corresponding meaning. Citation of references is not an admission that such references are prior art to the present invention.

We claim:

1. A radiation attenuating and scattering reference member with improved thermal stability comprising:
    one, or more than one partially or totally radiation attenuating element comprising at least one aperture for transmission of radiation therethrough, and
    one, or more than one radiation scattering element,
    wherein said radiation attenuating and scattering elements are placed in series so that radiation transmitted through said reference member passes through each of said attenuating and scattering elements.

2. The reference member of claim 1, further comprising a mount to hold said radiation attenuating element and said scattering element in a selected position relative to each other within said mount, and in relation to an instrument.

3. The reference member of claim 1, wherein said one, or more than one attenuating element and said one, or more than one scattering element are bonded together.

4. The reference member according to claim 1, wherein said radiation attenuating element comprises two, or more than two apertures for transmission of radiation therethrough.

5. The reference member according to claim 3, wherein said radiation attenuating element comprises two, or more than two apertures for transmission of radiation therethrough.

6. The reference member according to claim 4, wherein said radiation attenuating element is formed of a material that partially or totally blocks, absorbs, reflects, back scatters or a combination thereof, any incident radiation.

7. The reference member according to claim 6, wherein said material is selected from the group consisting of INVAR, tungsten, brass, and a material substantially non-transparent for incident radiation.

8. The reference member according to claim 1, wherein said radiation scattering element comprises a radiation volume scattering material selected from the group consisting of opalescent glass, SPECTRALON, PTFE, and a material whose surface may be modified to scatter radiation selected from the group consisting of ZERODUR, fused silica, quartz, sapphire, diamond, and a transparent material with substantially low thermal expansion.

9. The reference member according to claim 2, wherein said radiation scattering element is formed of a volume radiation scattering material selected from the group consisting of opalescent glass, SPECTRALON, PTFE, and a material whose surface may be modified to scatter incident radiation in a random or controlled fashion, selected from the group consisting of ZERODUR, fused silica, quartz, sapphire, diamond, and a transparent material with substantially low thermal expansion.

10. The reference member according to claim 8, wherein said radiation scattering element comprises an electromagnetic radiation scattering structure on one or both surfaces.

11. The reference member according to claim 9, wherein said radiation scattering element comprises an electromagnetic radiation scattering structure on one or both surfaces.

12. The reference member according to claim 1, wherein said radiation attenuating element and said scattering element are in the form of plates.

13. The reference member according to claim 3, wherein said radiation attenuating element and said scattering element are in the form of plates.

14. A reference member comprising one, or more than one radiation attenuating element made from INVAR, adjacent to and in series with, at least one thermally stable scattering element made from ZERODUR.

15. The reference member according to claim 1, wherein said radiation attenuating element is made of radiation non-transparent foil comprising a plurality of openings, said openings having a diameter and spaced apart in a manner suitable to achieve a required attenuation of incident radiation.

16. The reference member according to claim 1, wherein said radiation attenuating element comprises one aperture.

17. The reference member according to claim 8 wherein said radiation attenuating element comprises one aperture.

18. A radiation attenuating and scattering reference member with improved thermal stability comprising, a radiation attenuating-scattering element comprising a first, and a second surface, wherein a portion of said radiation attenuating-scattering element is opaque to electromagnetic radiation and comprises one, or more than one aperture for transmission of radiation there through, and wherein said second surface is modified to scatter electromagnetic radiation.

19. The radiation attenuating and scattering reference member of claim 18, wherein said radiation attenuating-scattering element comprises a volume scattering material selected from the group consisting of opalescent glass, light scattering ceramic, TEFLON®, PTFE, SPECTRALON.

20. The radiation attenuating and scattering reference member of claim 18, wherein said radiation attenuating-scattering element comprises a partially or totally radiation non-absorbing thermally stable material, whose surface can be modified to scatter incident radiation in a random or controlled fashion, said thermally stable material selected from the group consisting of ZERODUR, fused silica, quartz, sapphire, diamond, low expansion glass and a non-absorbing material with low thermal expansion, and wherein said first surface is covered with an electromagnetic radiation opaque layer.

21. The radiation attenuating and scattering reference member of claim 20, wherein said electromagnetic radiation opaque layer is selected from the group consisting of chromium, alloy of nickel, alloy of chromium, aluminum, silver, gold, and a material that is non-transparent to light.

22. The radiation attenuating and scattering reference member of claim 18, wherein said second surface is ground, etched or otherwise processed to scatter incident radiation in a random or controlled fashion.

23. The reference member of claim 1, wherein said reference member comprises a plurality of radiation attenuation elements and a plurality of radiation scattering elements.

24. A method for attenuating electromagnetic radiation comprising;

i) providing a source of electromagnetic radiation;

ii) placing the reference member according to claim 1 between said source of electromagnetic radiation and a detector to produce an attenuated electromagnetic beam; and iii) detecting said beam at said detector.

25. The method according to claim 23 wherein said reference member is adjusted to match scattering and attenuation characteristics of a given sample.

26. A method for calibrating a spectrometer comprising, placing the reference member according to claim 1 between a source of electromagnetic radiation and a detector to produce an attenuated electromagnetic beam, measuring the absorbance of said reference member, and adjusting said spectrometer.

* * * * *

UNITED STATES PATENT AND TRADEMARK OFFICE
CERTIFICATE OF CORRECTION

PATENT NO. : 6,912,049 B2
DATED : June 28, 2005
INVENTOR(S) : Pawluczyk et al.

It is certified that error appears in the above-identified patent and that said Letters Patent is hereby corrected as shown below:

Title page,
Item [73], Assignee, should read -- NIR Diagnostics Inc. --.

Signed and Sealed this

Eighth Day of November, 2005

JON W. DUDAS
*Director of the United States Patent and Trademark Office*